United States Patent [19]

Kanda et al.

[11] Patent Number: 5,751,386
[45] Date of Patent: May 12, 1998

[54] ILLUMINATION DEVICE WITH LUMINANCE DISTRIBUTION ADJUSTING REFLECTION PLATE AND LIQUID CRYSTAL DISPLAY APPARATUS INCLUDING SAME

[75] Inventors: Toshiyuki Kanda, Chigasaki; Hiroshi Takabayashi, Atsugi; Yoshihiro Onitsuka, Hiratsuka, all of Japan

[73] Assignee: Canon Kabushiki Kaisha, Tokyo, Japan

[21] Appl. No.: 906,157

[22] Filed: Aug. 5, 1997

Related U.S. Application Data

[63] Continuation of Ser. No. 571,783, Dec. 13, 1995, abandoned.

[30] Foreign Application Priority Data

Dec. 16, 1994 [JP] Japan .................... 6-313694

[51] Int. Cl.$^6$ .................... G02F 1/1335; G01D 11/28; F21V 7/04
[52] U.S. Cl. .................... 349/65; 349/62; 349/64; 362/26; 362/31
[58] Field of Search .................... 349/62, 64, 65; 362/31, 26

[56] References Cited

U.S. PATENT DOCUMENTS

| | | | |
|---|---|---|---|
| 4,729,068 | 3/1988 | Ohe | 362/31 |
| 5,130,898 | 7/1992 | Akahane | 362/31 |
| 5,134,549 | 7/1992 | Yokoyama | 362/31 |
| 5,207,493 | 5/1993 | Murase et al. | 362/31 |
| 5,262,928 | 11/1993 | Kashima et al. | 349/65 |
| 5,283,673 | 2/1994 | Murase et al. | 349/65 |
| 5,363,294 | 11/1994 | Yamamoto et al. | 362/330 |
| 5,394,308 | 2/1995 | Watanabe et al. | 349/64 |
| 5,584,556 | 12/1996 | Yokoyama et al. | 349/62 |
| 5,600,462 | 2/1997 | Suzuki et al. | 349/62 |
| 5,667,289 | 9/1997 | Akahane et al. | 349/70 |
| 5,673,128 | 9/1997 | Ohta et al. | 349/62 |

FOREIGN PATENT DOCUMENTS

| | | |
|---|---|---|
| 0607453 | 7/1994 | European Pat. Off. . |
| 3611174 | 10/1987 | Germany . |
| 3910520 | 10/1990 | Germany . |
| 5-264995 | 10/1993 | Japan . |
| 2247309 | 2/1992 | United Kingdom . |
| 2267378 | 12/1993 | United Kingdom . |

*Primary Examiner*—Anita Pellman Gross
*Attorney, Agent, or Firm*—Fitzpatrick, Cella, Harper & Scinto

[57] ABSTRACT

An illumination device includes: a linear light source; first reflection means disposed opposite to and with a spacing from the linear light source; a light guide means disposed between the linear light source and the first reflection means; and a second reflection means disposed behind the light guide means so that light issued from the linear light source is transmitted through the light guide means and reflected by the first and second reflection means to be emitted in a direction forward from the light guide means. Further, a luminance distribution-adjusting means for reflecting light transmitted through the light guide means is disposed along the light guide means in a distribution density which varies at a changing rate free from discontinuity so as to adjust the luminance distribution of the light emitted in the direction forward from the light guide means. The illumination device may suitably be used as a backlight unit for a liquid crystal panel to provide a liquid crystal display apparatus having improved display qualities.

25 Claims, 5 Drawing Sheets

ILLUMINATION DEVICE WITH LUMINANCE DISTRIBUTION ADJUSTING REFLECTION PLATE AND LIQUID CRYSTAL DISPLAY APPARATUS INCLUDING SAME

This application is a continuation of application Ser. No. 08/571,783, filed Dec. 13, 1995, now abandoned.

FIELD OF THE INVENTION AND RELATED ART

The present invention relates to an illumination device used, e.g., as a backlight device for illuminating a liquid crystal panel, and a liquid crystal display apparatus including the illumination device, more particularly a planar illumination device improved in uniformity of luminance distribution.

Various proposals have been made regarding a backlight device for illuminating a transmission-type liquid crystal panel, etc., from the back side. As an example thereof, FIG. 1 shows a so-called edge-type planar illumination device having light sources at edges, and FIG. 2 shows a section of a liquid crystal display apparatus including such an illumination device.

Referring to FIG. 1, the illumination device (backlight device) 1 includes a fluorescent lamp 2 as a linear light source and a side reflection plate 3 (as a first reflection means) disposed opposite to and with a spacing from the fluorescent lamp 2. Between the fluorescent lamp 2 and the side reflection plate 3, a transparent acrylic resin plate 4 is disposed as a light guide means. The fluorescent lamp 2 is covered with a fallen or sideway U-shaped reflector 5 as shown in FIG. 2. The reflector 5 is formed of an aluminum sheet, and the inner surface thereof is mirror-finished, e.g., by vapor deposition of silver. Behind the acrylic plate 4 and between the fluorescent lamp 2 and the side reflection plate 3, a rear reflection plate (second reflection means) 6 is disposed. The rear reflection plate 6 is formed of an aluminum sheet similarly as the reflector 5, and the inner face thereof is mirror-finished by vapor deposition of silver. On a front (or fore) side of the acrylic plate 4, a diffusion plate 7 is disposed so as to diffuse light from the acrylic plate 4. Further, before (on a front side (upper side in the figure) of) the diffusion plate 7, a liquid crystal panel P is disposed.

By the way, when such a backlight device 1 is driven to turn on the fluorescent lamp 2 without disposing a diffusive reflection pattern (luminance distribution adjusting means) 9 comprising a large number of dots 10, a major portion of light reflected from the reflection plate 6 is not emitted uniformly toward the liquid crystal panel P, and most light emitted toward the liquid crystal panel P comes from the vicinity of the fluorescent lamp 2 or the side reflection plate 3, thus failing to realize a uniform luminance of such a planar illumination device.

Accordingly, it has been practiced to dispose a diffusive reflection pattern (luminance distribution adjusting means) 9 comprising a large number of dots 10 formed, e.g., by printing of a white paint on the back side of the acrylic plate 4 as shown in FIG. 3, thereby aiming at luminance uniformization by utilization of random reflection. These dots 10 are formed in a larger size at a central portion of the acrylic plate 4 and in a smaller size and with a larger spacing at positions approaching the edges of the acrylic plate 4 as shown in FIG. 3, wherein characters "SP" and "D" represent that the distribution density of the dots 10 is sparse and dense, respectively. The planar density distribution of the diffusive reflection pattern has been designed to be sparse at edges and dense at a center, respectively, of the acrylic plate 4 as shown in FIG. 4. Further, the density distribution in a section including the oppositely disposed fluorescent lamp 2 and the side reflection plate 3 has been one represented by a broken line shown in FIG. 5 showing a lowest density in proximity to the edges of the acrylic plate 4 and a density which increases proportional to a distance from the edges of the acrylic plate 4. As a result, a larger amount of light is emitted in a fore direction from the acrylic plate 4 at a position with a higher density of the diffusive reflection pattern 9 (or dots 10 thereof) and a smaller amount of light is emitted at a position with a lower density of the diffusive reflection pattern 9. Incidentally, the above-described distribution density represents (or is based on) an areal ratio of a portion occupied with the diffusive reflection pattern 9 in a unit area of the light guide means (acrylic plate) 4. An iso-(distribution) density curve represents a line (or curved line) connecting points of identical distribution density of the diffusive reflection pattern 9. These also hold true with the other Figures relating to distribution densities of a diffusive reflection pattern and iso-distribution density curves thereof.

As a result, regarding light transmitted through the acrylic plate 4, a portion thereof is totally reflected by the acrylic plate 4, a portion thereof is reflected at random by the diffusive reflection pattern 9, and a further portion thereof is reflected by the reflection plates 3 and 6, thereby illuminating the liquid crystal panel P.

However, in the above-described illumination device (backlight device) designed to dispose the diffusive reflection dots 10 so as to show a distribution density curve represented by the broken line in FIG. 5 which includes an acute-angular change at a point of maximum distribution density of the diffusive reflection pattern, the luminance takes the maximum at the point and bright lines occur from the point as the center, thereby lowering the display quality of a liquid crystal panel of which the resolution has been particularly measured in recent years.

SUMMARY OF THE INVENTION

An object of the present invention is to provide an illumination device capable of providing a uniform luminance while preventing the occurrence of bright lines.

Another object of the present invention is to provide a liquid crystal display apparatus showing good display qualities by using an illumination device having uniformized luminance.

According to the present invention, there is provided an illumination device, comprising:

- a linear light source,
- a first reflection means disposed opposite to and with a spacing from the linear light source,
- a light guide means disposed between the linear light source and the first reflection means,
- a second reflection means disposed behind the light guide means so that light issued from the linear light source is transmitted through the light guide means and reflected by the first and second reflection means to be emitted in a direction forward from the light guide means, and
- a luminance distribution-adjusting means for reflecting light transmitted through the light guide means disposed along the light guide means in a distribution density which varies at a changing rate free from discontinuity so as to adjust the luminance distribution of the light emitted in the direction forward from the light guide means.

According to another aspect of the present invention, there is provided a liquid crystal display apparatus including an illumination device as described above and a liquid crystal panel disposed in front of the illumination device so as to be illuminated with light from the illumination device to effect a display.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

The illumination device according to the present invention is principally characterized by having a linear light source and a first reflection means disposed opposite to each other with a light guide member disposed therebetween, and also a luminance distribution means disposed along or in superposition with the light guide member in a distribution density which varies without angular deflection or at a changing rate free from discontinuity along a linear horizontal direction including the linear light source, the light guide member and the first reflection means. It is particularly preferred that the distribution density curve forms a continuously changing curve.

Figure 5:
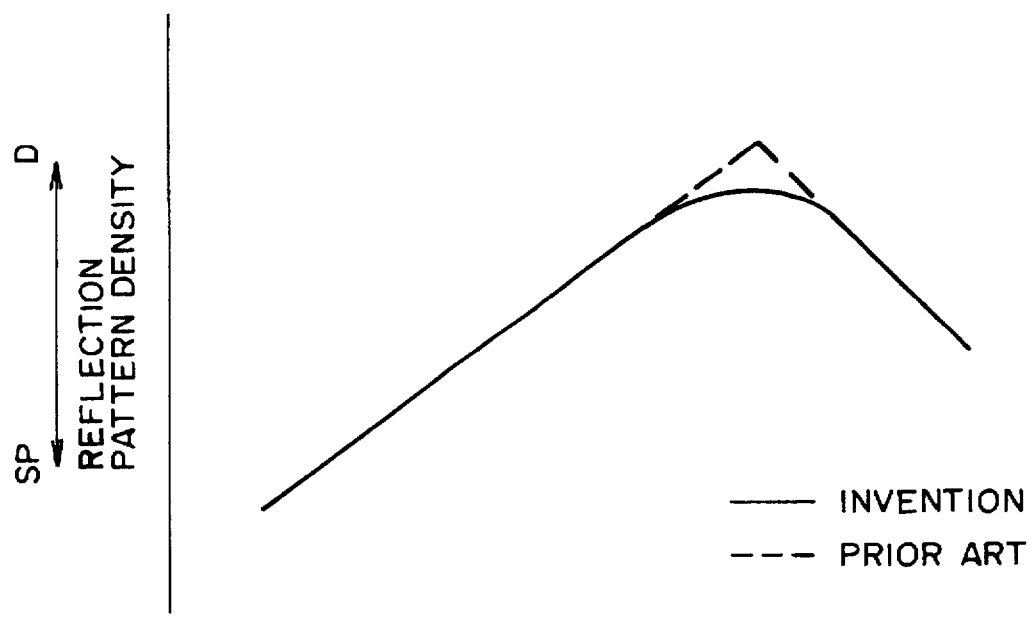
FIG. 5 illustrates diffusive reflection pattern distribution densities along a transverse section between a fluorescent lamp and a side reflection plate.
Figure 5:
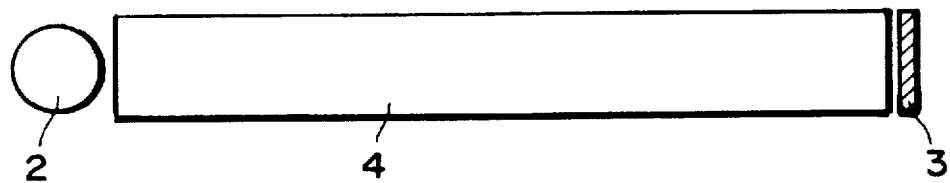

More specifically, in the present invention, it is preferred that the luminance distribution-adjusting means is disposed to form a distribution density-changing curve as represented by a solid line in FIG. 5 having a moderate maximum (or minimum) density portion characterized as a region providing a slope (density-changing rate per length along a transverse section) which is at most 50% of a maximum slope along the curve for a length (including the maximum or minimum density portion) of at least 5% of the entire transverse section length of the light guide means (i.e., nearly the transverse length of the illumination device).

Due to the above-described structure, light issued from the linear light sources is transmitted through within the light guide member, and a portion thereof is reflected by the first and second reflection means to be emitted forward from the light guide member. Further, a portion of the light is reflected by the luminance distribution control or adjusting means to adjust the entire luminance distribution of light emitted in a direction forward from the light guide member. In this instance, as the luminance distribution adjusting means is disposed in a distribution density so as to provide a continuous changing rate, it is possible to suppress the occurrence of bright lines liable to occur at a point or line giving a discontinuity of such distribution density changing rate.

In the above-described structure, it is preferred that the luminance distribution adjusting means is disposed between the light guide means and the second reflection means in varying distribution densities so that the amount of light reflected on the side of the second reflection means and emitted in a forward direction from the light guide means is larger in a region of a higher distribution density and smaller in a region of a lower distribution density, respectively of the luminance distribution adjusting means. Further, in this case, it is preferred that the luminance distribution adjusting means is disposed between the linear light source and the first reflection means in a distribution density such that the distribution density is lower in the vicinity of the linear light source than in the vicinity of the first reflection means and becomes higher at a position leaving away from the linear light source and the first reflection means to assume a maximum without angular deflection. In this instance, the distribution densities of the luminance distribution adjusting means in the vicinities of the linear light source and the first reflection means, respectively, may be set depending on a difference in luminance between the light from the linear light source and the light reflected from the first reflection means. Further, the distribution density of the luminance distribution adjusting means may be designed to assume a maximum at a position which is at different distances from the linear light source and the first reflection means. Further, it is also preferred that the distribution density of the luminance distribution adjusting means is increased at corners of the light guide means.

Alternatively, it is also preferred in the present invention that the luminance distribution adjusting means is disposed on a fore side of the light guide means and opposite the second reflection means in varying distribution densities so that the amount of light emitted in a forward direction from the light guide means is smaller in a region of a higher distribution density and larger in a region of a lower distribution density, respectively of the luminance distribution adjusting means. In this case, it is preferred that the luminance distribution adjusting means is disposed between the linear light source and the first reflection means in a distribution density such that the distribution density is higher in the vicinity of the linear light source than in the vicinity of the first reflection means and becomes lower at a position leaving away from the linear light source and the first reflection means to assume a minimum without angular deflection.

The distribution densities of the luminance distribution adjusting means in the vicinities of the linear light source and the first reflection means, respectively, may be set depending on a difference in luminance between the light from the linear light source and the light reflected from the first reflection means. It is also preferred in this case that the distribution density of the luminance distribution adjusting means assumes a minimum at a position which is at different distances from the linear light source and the first reflection means. It is further preferred that the distribution density of the luminance distribution adjusting means is lowered at corners of the light guide means.

In the present invention, the above-mentioned luminance distribution adjusting means may preferably be constituted as a reflection pattern comprising a large number of dots causing random reflection of light incident thereto from the linear light source. Alternatively, the luminance distribution adjusting means may be constituted as a mesh pattern causing random reflection of light incident thereto from the linear light source. The light guide means may be provided as a transparent sheet member of, e.g., an acrylic resin plate. Alternatively, the light guide means may be provided as a space formed between the linear light source and the side reflection means.

Hereinbelow, some preferred embodiments of the present invention will be described more specifically with reference to the drawings.

(First Embodiment)

A first embodiment of the present invention will now be described with reference to FIG. 5.

Figure 1:
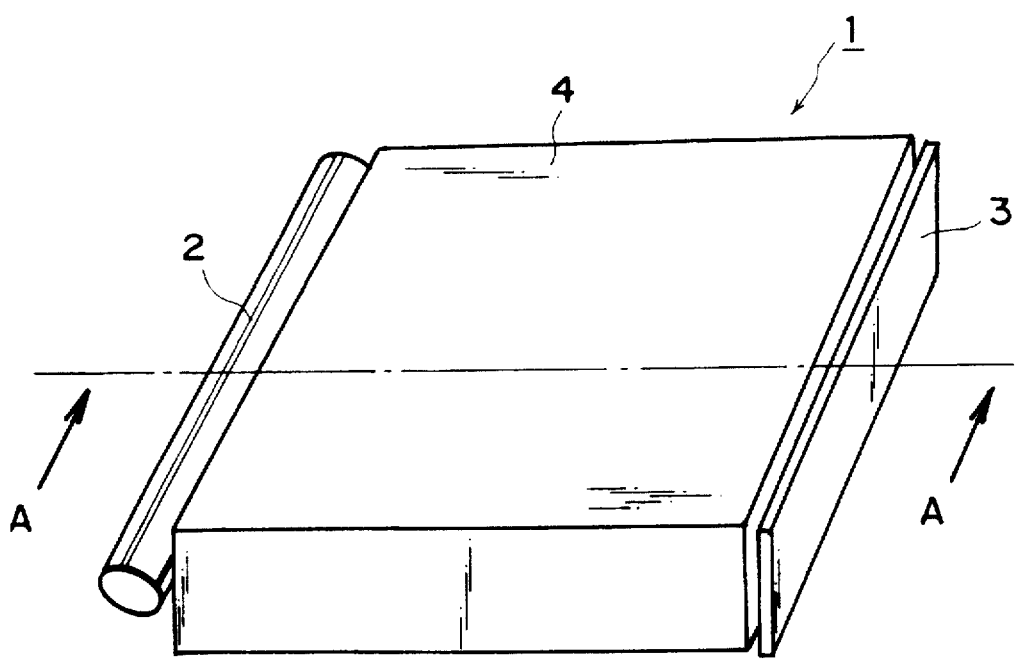
FIG. 1 is a schematic perspective view illustrating a structural outline of an illumination device.
Figure 2:
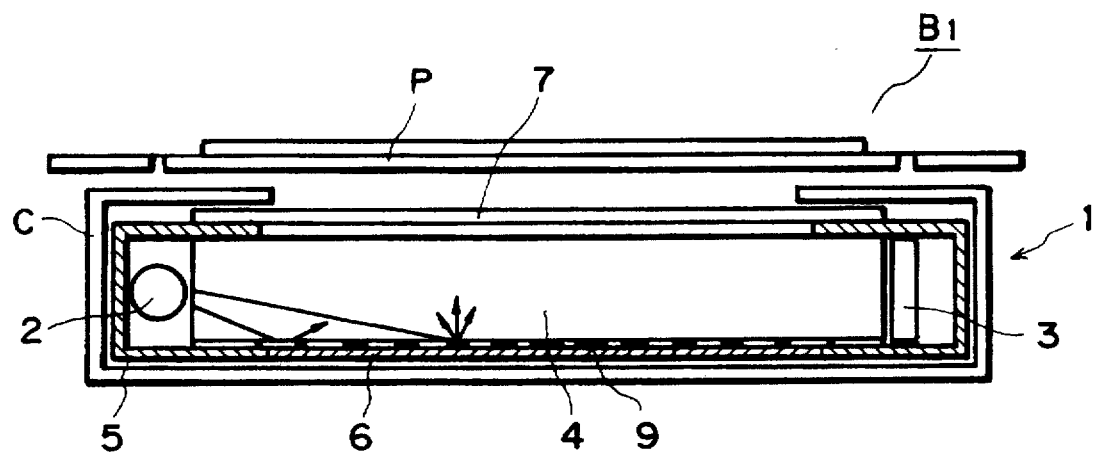
FIG. 2 is a sectional view of a liquid crystal display apparatus including a section taken along line A—A in FIG. 1.
Figure 3:
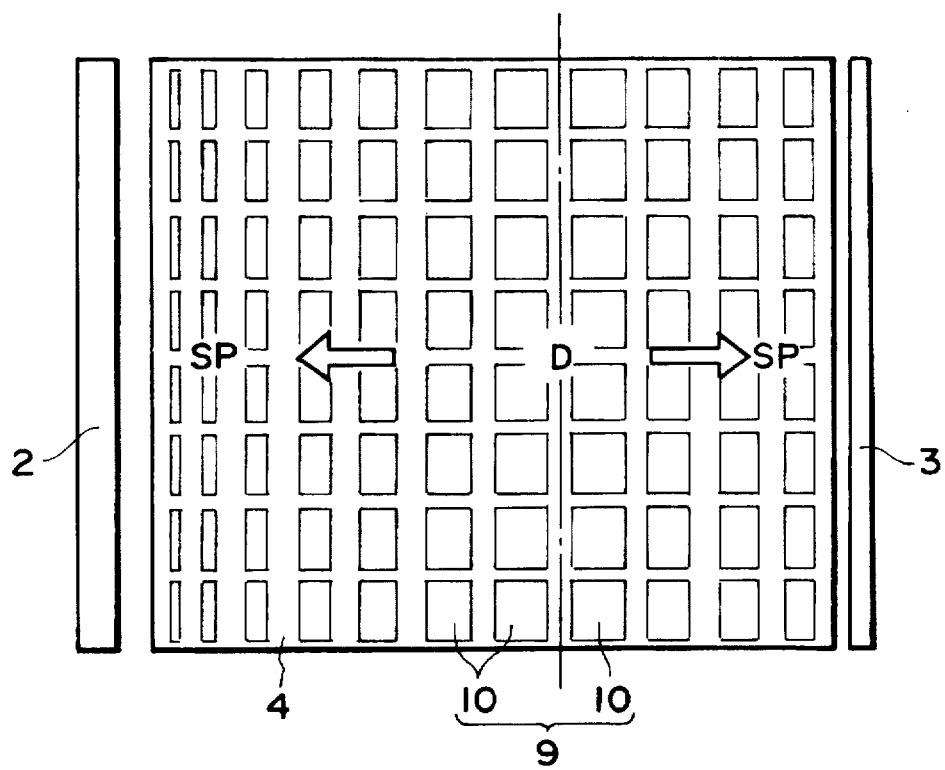
FIG. 3 is an illustration of an arrangement of diffusive reflection pattern dots in an illumination device.
Figure 4:
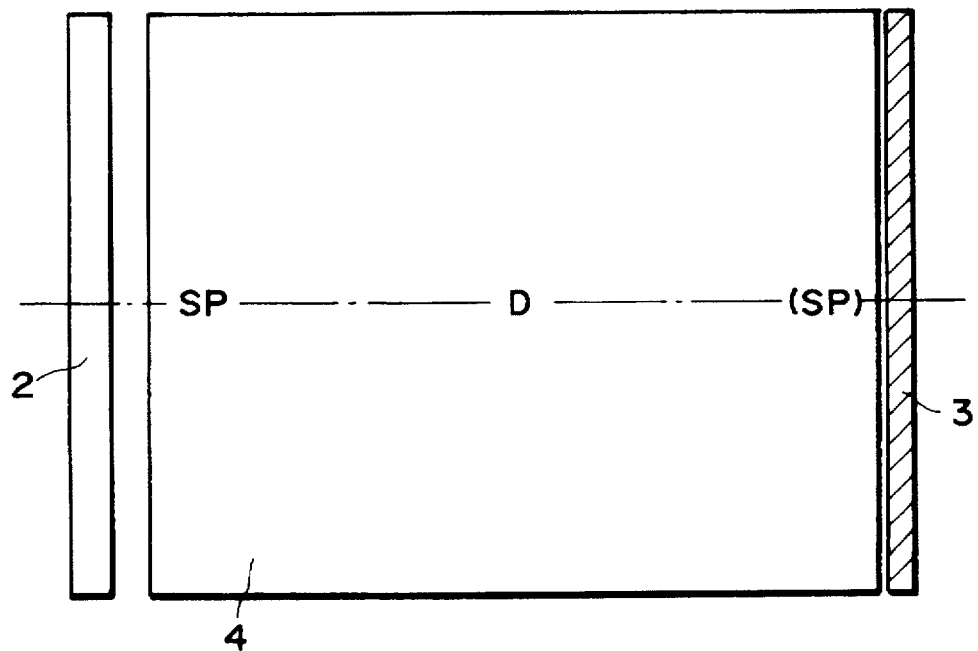
FIG. 4 is an illustration of a planar density distribution of diffusive reflection pattern dots in an illumination device.

An illumination device (backlight device) according to this embodiment has an outer appearance similar to that shown in FIGS. 1 and 2 including a rectangular light guide means 4 and a fluorescent lamp 2 and a side reflection plate 3 disposed along a pair of parallel sides of the rectangular light guide means 4. However, the distribution density of the diffusive reflection pattern 9 taken along a section including a line A—A in FIG. 1 is as shown in FIG. 5 (solid line). More specifically, the distribution density of the diffusive reflection pattern 9 along a section including the fluorescent lamp (linear light source) 2 and the side reflection plate (first reflection means) 3 disposed opposite to each other and passing through a center of the illumination device is designed so that the distribution density in the vicinity of the fluorescent lamp 2 is lower than in the vicinity of the side reflection plate 3 and becomes higher as the position leaves away from the fluorescent lamp 2 and the side reflection plate 3. Further, the distribution density is designed to assume a maximum (round peak) at a position which is shifted from the exact central point of the acrylic plate (light guide means) 4. i.e., the exact mid point between the fluorescent lamp 2 and the side reflection plate 3, toward the side reflection plate 3 side (right side). In other words, the distance between the maximum (peak) and the side reflection plate 3 is set to be smaller than the distance between the maximum and the fluorescent lamp 2, and the maximum is designed to provide a gently varying changing rate in distribution density free from discontinuity. The above-mentioned setting of a lower distribution density in the vicinity of the fluorescent lamp 2 than in the vicinity of the side reflection plate is adopted in view of a smaller reflected light quantity from the side reflection plate 3 than the emitted light quantity from the fluorescent lamp 2. In other words, the distribution densities in the vicinities of the fluorescent lamp 2 and the side reflection plate 3 may be set depending on a difference in luminance of these members. The above-mentioned shift of the position of the maximum from the very center of the acrylic resin plate is determined also in view of the luminance difference.

According to this embodiment, the occurrence of bright lines on an illumination surface of an illumination device (backlight device) is suppressed to provide a uniform planar illumination device, thereby providing the liquid crystal panel with good display qualities. Further, according to this embodiment, a side reflection plate 3 is used instead of a fluorescent lamp, whereby it becomes possible to provide an inexpensive but high-luminance illumination device generating a relatively small generated heat quantity while it may depend on an areal size thereof.

(Second Embodiment)

Now, a second embodiment of the present invention will be described with reference to FIGS. 6 and 7, wherein identical members are denoted by identical numerals as in FIG. 2 and detailed explanation thereof may be omitted.

Figure 6:
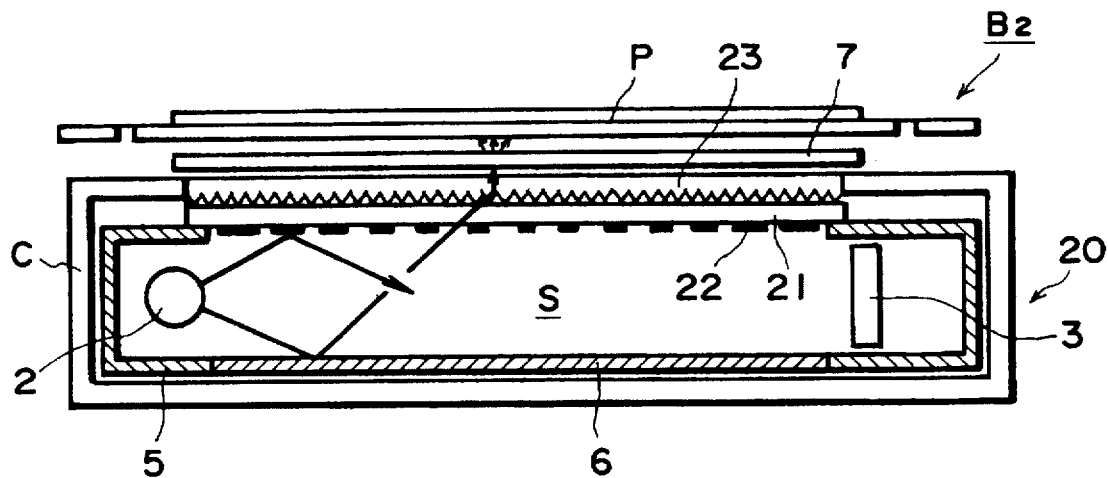
FIG. 6 is a sectional view of a crystal display apparatus according to a second embodiment of the invention.

With reference to FIG. 6, an illumination device 20 according to this embodiment is provided with a front or fore-side transmission plate 21 disposed in parallel with a rear reflection plate (reflection means) 6 and a space $\underline{S}$ formed as a light guide means between the rear reflection plate 6 and the front transmission plate 21. The front transmission plate 2 is formed of a thin transparent acrylic resin plate, below which is disposed a reflection pattern (luminance distribution adjusting means) 22. In other words, the reflection pattern 21 is disposed on a fore-side of the light guide means (space S) so as to be opposite to the rear reflection plate 6. The reflection pattern 22 may for example be formed by vapor deposition of aluminum in the form of a mesh or dots in a distribution density such that a smaller amount of light is emitted in a fore direction toward the liquid crystal panel P at a position of a higher distribution density and a larger amount of the light is emitted at a position of a lower distribution density.

Figure 7:
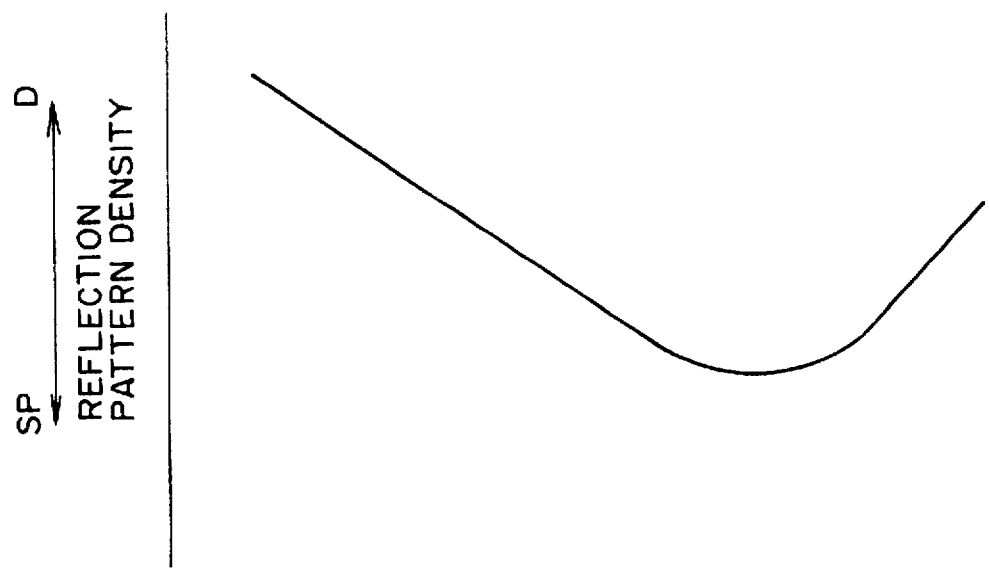
FIG. 7 illustrates a diffusive reflection pattern distribution density along a transverse section between a fluorescent lamp and a side reflection plate according to the second embodiment.
Figure 7:
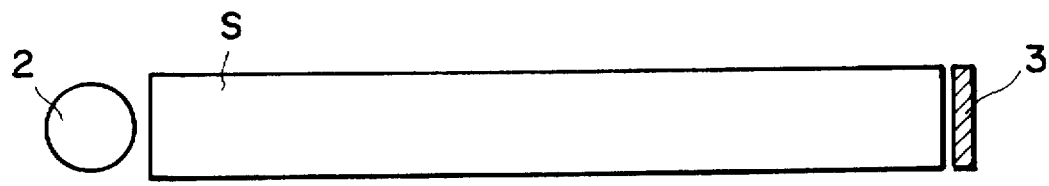

The distribution density of the reflection pattern 22 is designed to be as shown in FIG. 7. More specifically, the distribution density of the reflection pattern 22 along a section including the fluorescent lamp 2 and the side reflection plate (first reflection means) 3 and a center of the illumination device 20 is set to be higher in the vicinity of the fluorescent lamp 2 than in the vicinity of the side reflection plate 3 and become higher at positions leaving away from the fluorescent lamp 2 and the side reflection plate 3. Further, the distribution density is designed to assume a minimum at a position which is shifted from the very center of the space S (light guide means), i.e., the very mid point between the fluorescent lamp 2 and the side reflection plate 3, toward the right side. In other words, the minimum position-side reflection plate distance is set to be smaller than the minimum position-fluorescent lamp distance, and the minimum is designed to provide a changing rate which varies gently without discontinuity. The above-mentioned setting of a higher distribution density in the vicinity of the fluorescent lamp 2 than in the vicinity of the side reflection plate is adopted in view of a smaller reflected light quantity from the side reflection plate 3 than the emitted light quantity from the fluorescent lamp 2. In other words, the distribution densities in the vicinities of the fluorescent lamp 2 and the side reflection plate 3 may be set depending on a difference in luminance of these members. The above-mentioned shift of the position of the minimum from the very center of the acrylic resin plate is determined also in view of the luminance difference.

On the other hand, on a fore-side (upper side) of the front transmission plate 21, a prism sheet 23 is disposed so as to uniformize the directionality of illumination light. On the prism sheet 23, respective prisms are disposed so that the extension direction of each prism ridge is parallel with the longitudinally extending directions of the fluorescent lamp 2. (In case of using 2 fluorescent lamps extending in directions crossing each other, another prism sheet may preferably be disposed in superposition so that its prism ridge extension direction is in parallel with the longitudinal extension direction of the other fluorescent lamp.) Further, the respective prisms are so disposed that their apex angles are directed toward the front transmission plate 21.

In this embodiment, a liquid crystal display apparatus $B_2$ is constituted by the above-mentioned backlight device 20 and the liquid crystal panel P.

According to this embodiment, the occurrence of bright lines on an illumination surface of an illumination device (backlight device) is suppressed to provide a uniform planar illumination device, thereby providing the liquid crystal panel with good display qualities. Further, according to this embodiment, a side reflection plate 3 is used instead of a fluorescent lamp, whereby it becomes possible to provide an inexpensive but high-luminance illumination device generating a relatively small generated heat quantity while it may depend on an areal size thereof.

Figure 8:
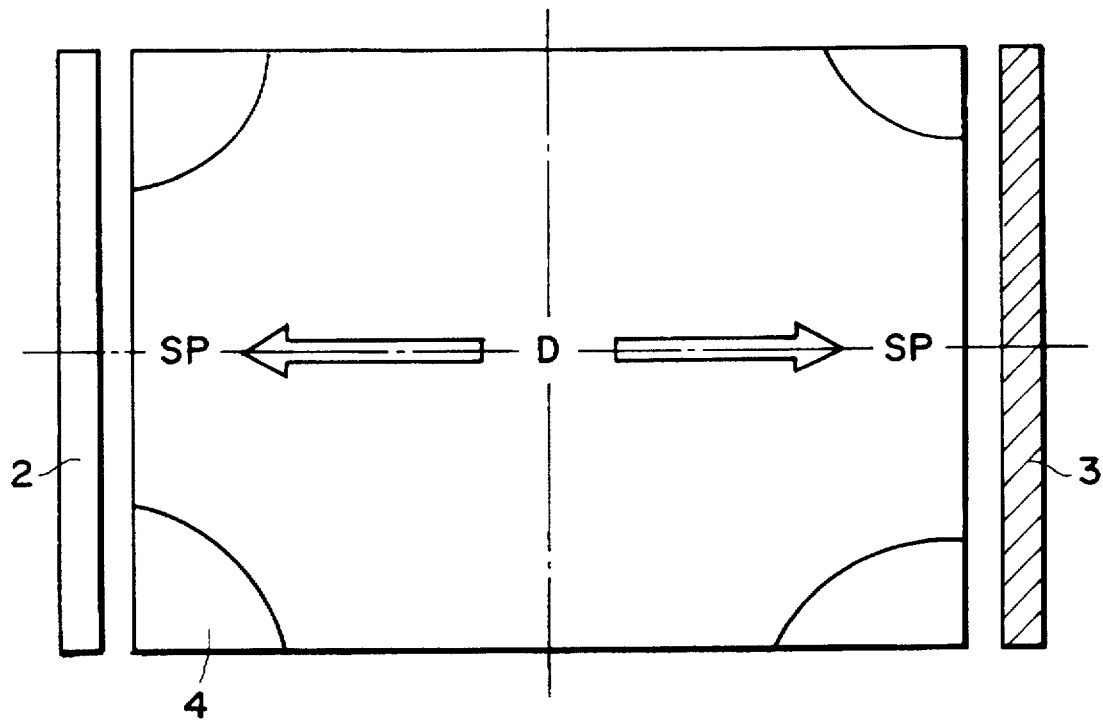
FIG. 8 is an illustration of a planar distribution density of a diffusive reflection pattern according to another embodiment of the present invention.

As described above, the diffusive reflection pattern 9 is disposed in a distribution density as represented by a solid line shown in FIG. 5 in the first embodiment, and the reflection pattern 22 is disposed in a distribution density as shown in FIG. 7. However, they are not limitative. For example, in case where the light guide means (acrylic plate 4 or light guide space S) provides four corner portions where the luminance is lowered, it is possible to provide a higher distribution density of the diffusive reflection pattern 9 than the surrounding regions in the first embodiment, or it is possible to provide a lower distribution density of the reflection pattern 22 than the surrounding regions, thereby increasing the luminance of light emitted from such corner regions to moderate and substantially uniformize the luminance distribution over the entire illumination surface (as shown in FIG. 8). On the other hand, in case where there is a locally excessive luminance portion, it is possible to lower the distribution density of the diffusive reflection pattern 9 in the first embodiment or it is possible to increase the distribution density of the reflection pattern 22 in the second embodiment, respectively than in the surrounding region, thereby uniformizing the luminance distribution over the entire surface. Such an adjustment of the distribution density may be performed depending on the type (characteristic) and disposition of the light source used.

In the above-embodiments, the (diffusive) reflection pattern has been generally described to be formed in a dot pattern but may also be formed in a mesh pattern.

Further, the light guide means has been described as an acrylic plate 4 in the first embodiment and a light guide space S in the second embodiment but it is also possible to use a light guide space in the first embodiment and a transparent sheet member such as an acrylic plate in the second embodiment.

Figure 9:
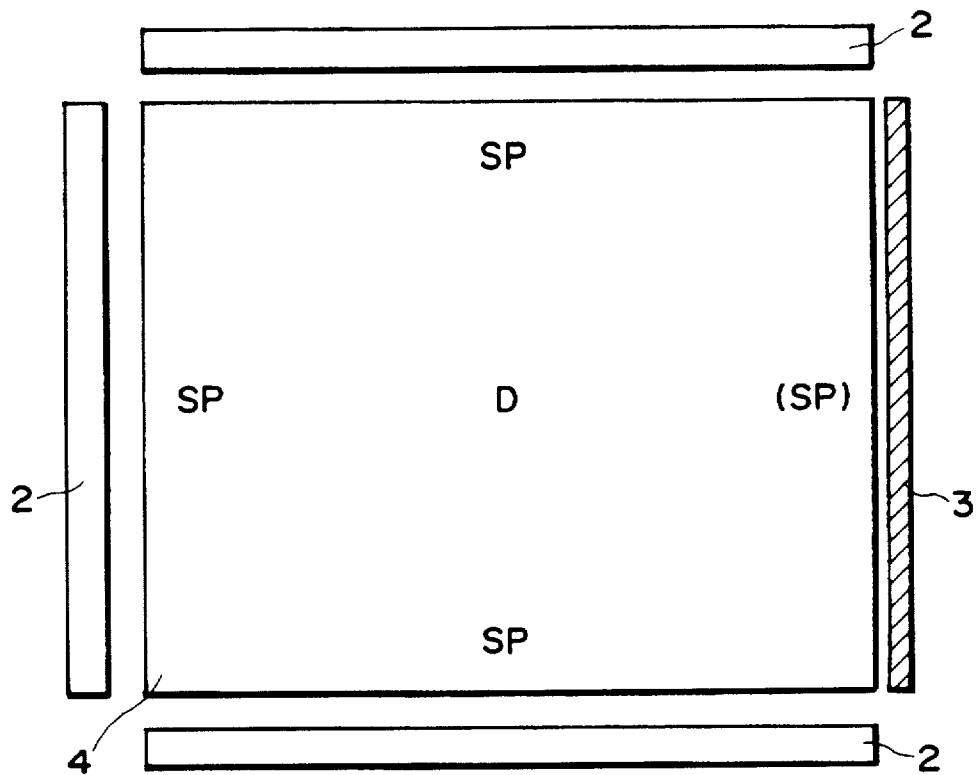
FIGS. 9 and 10 are respectively a plan view showing an arrangement of fluorescent lamps and side reflection plate(s) according to another embodiment.
Figure 10:
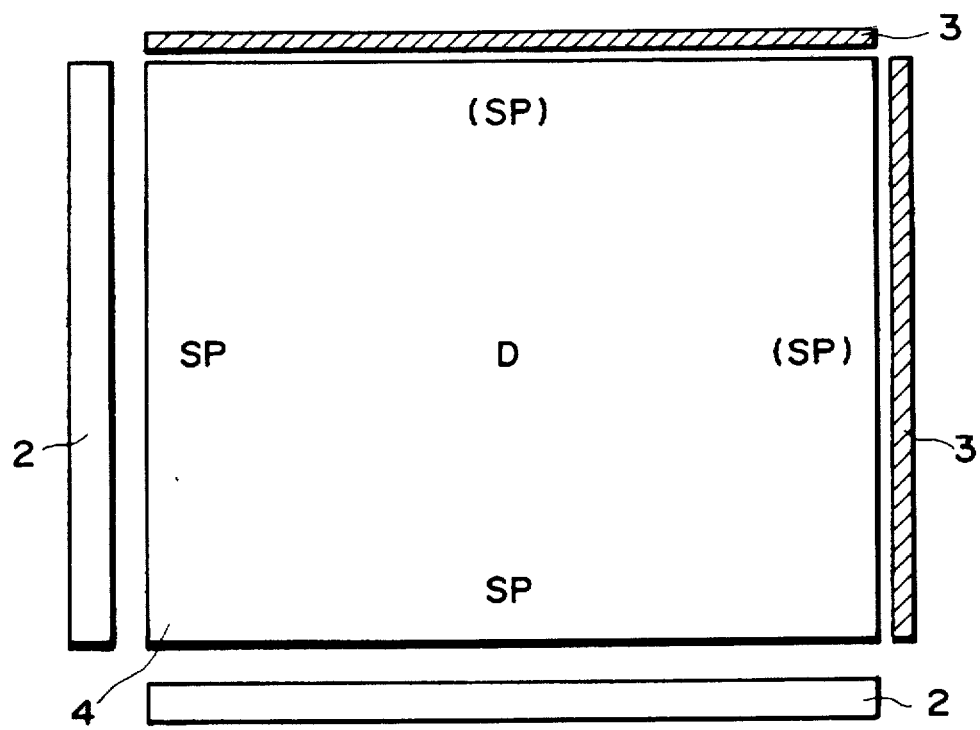

The above embodiments use one fluorescent lamp 2 and one side reflection plate 3, but this is not limitative. For example, as shown in FIG. 9, it is possible to dispose fluorescent lamps 2 on three sides of the light guide means 4 and a side reflection plate 3 on the remaining one side of the light guide means 4. Alternatively, it is also possible to dispose fluorescent lamps 2 on neighboring two sides and side reflection plates 3 on the remaining two neighboring sides, respectively of the light guide means 4 as shown in FIG. 10.

Also in these embodiments, each section including a fluorescent lamp 2, a side reflection plate 3 and a center of a light guide means 4 may preferably have a distribution density of the luminance distribution adjusting means which varies gently with a changing rate free from discontinuity. FIGS. 9 and 10 show embodiments wherein a reflection pattern in a distribution density as shown is disposed between a rear reflection plate and a light guide means. However, in case where such a reflection pattern is disposed on a fore side of the light guide means, it may be appropriate to adopt a distribution density pattern opposite to those shown in FIGS. 9 and 10, i.e., D→SP and SP→D.

As described above, according to the p present invention, it becomes possible to prevent the occurrence of bright lines on a planar illumination device to uniformize the luminance distribution.

Further, according to the present invention, by using such an illumination device having a uniformized luminance distribution as a backlight device of a liquid crystal panel, it becomes possible to improve the display qualities of the liquid crystal panel.

What is claimed is:

1. An illumination device, comprising:
   a linear light source,
   a first reflection means disposed opposite to and spaced from the linear light source;
   a light guide means disposed between the linear light source and the first reflection means;
   a second reflection means disposed behind the light guide means so that light issued from the linear light source is transmitted through the light guide means and reflected by the first and second reflection means to be emitted from the light guide means in a forward direction; and
   a luminance distribution-adjusting means for reflecting light transmitted through the light guide means and disposed along the light guide means with a distribution density which varies at a changing rate free from discontinuity so as to adjust the luminance distribution of the light emitted from the light guide means in the forward direction;
   said luminance distribution-adjusting means being disposed between the light guide means and the second reflection means with varying distribution densities so that the amount of light reflected by the luminance distribution-adjusting means and emitted from the light guide means in a forward direction is larger in a region of a higher distribution density and smaller in a region of a lower distribution density, respectively, of the luminance distribution-adjusting means for an uniform intensity of light incident thereto; and the distribution density of the luminance distribution adjusting means is increased at corners of the light guide means, whereby the light emitted from the light guide means is made uniform.

2. An illumination device according to claim 1, wherein said luminance distribution adjusting means is disposed between the linear light source and the first reflection means with a distribution density such that the distribution density is lower in the vicinity of the linear light source than in the vicinity of the first reflection means and becomes higher at a position further away from the linear light source and the first reflection means to assume a maximum without angular deflection.

3. An illumination device according to claim 1, wherein the distribution densities of the luminance distribution adjusting means in the vicinities of the linear light source and the first reflection means, respectively, are set depending on a difference in luminance between the light from the linear light source and the light reflected from the first reflection means.

4. An illumination device according to claim 1, wherein the distribution density of the luminance distribution adjusting means assumes a maximum at a position which is at different distances from the linear light source and the first reflection means.

5. An illumination device according to claim 1, wherein said luminance distribution adjusting means comprises a plurality of dots reflecting light from the linear light source.

6. An illumination device according to claim 1, wherein said luminance distribution adjusting means is disposed in the form of a mesh reflecting light from the linear light source.

7. An illumination device according to claim 1, wherein said light guide means comprises an acrylic resin plate.

8. An illumination device according to claim 1, wherein said light guide means comprises a space formed between the linear light source and the first reflection means.

9. An illumination device, comprising:

a linear light source;

a first reflection means disposed opposite to and spaced from the linear light source;

a light guide means disposed between the linear light source and the first reflection means;

a second reflection means disposed behind the light guide means so that light issued form the linear light source is transmitted through the light guide means and reflected by the first and second reflection means to be emitted from the light guide means in a forward direction; and a luminance distribution-adjusting means for reflecting light transmitted through the light guide means and disposed along the light guide means with a distribution density which varies at a changing rate free from discontinuity so as to adjust the luminance distribution of the light emitted from the light guide means in the forward direction;

said luminance distribution-adjusting means being disposed on a front side of the light guide means and opposite the second reflection means with varying distribution densities so that the amount of light emitted from the light guide means in a forward direction is larger in a region of a higher distribution density and smaller in a region of a lower distribution density, respectively, of the luminance distribution adjusting means for an uniform intensity of light incident thereto; and the distribution density of the luminance distribution adjusting means is lowered at corners of the light guide means, whereby the light emitted through the luminance distribution-adjusting means is made uniform.

10. An illumination device according to claim 9, wherein said luminance distribution adjusting means is disposed between the linear light source and the first reflection means with a distribution density such that the distribution density is higher in the vicinity of the linear light source than in the vicinity of the first reflection means and becomes lower at a position further from the linear light source and the first reflection means to assume a minimum without deflection.

11. An illumination device according to claim 9, wherein the distribution densities of the luminance distribution adjusting means in the vicinities of the linear light source and the first reflection means, respectively, are set depending on a difference in luminance between the light from the linear light source and the light reflected from the first reflection means.

12. An illumination device according to claim 9, wherein the distribution density of the luminance distribution adjusting means assumes a minimum at a position which is at different distances from the linear light source and the first reflection means.

13. An illumination device according to claim 9, wherein said luminance distribution adjusting means comprises a plurality of dots reflecting light from the linear light source.

14. An illumination device according to claim 9, wherein said luminance distribution adjusting means is disposed in the form of a mesh reflecting light from the linear light source.

15. An illumination device according to claim 9, wherein said light guide means comprises an acrylic resin plate.

16. An illumination device according to claim 9, wherein said light guide means comprises a space formed between the linear light source and the first reflection means.

17. An illumination device, comprising:

a linear light source;

a first reflection means disposed opposite to and spaced from the linear light source;

light guide means disposed between the linear light source and the first refection means;

a second reflection means disposed behind the light guide means so that light issued from the linear light source is transmitted through the light guide means and reflected by the first and second reflection means to be emitted from the light guide means in a forward direction; and a luminance distribution-adjusting means for reflecting light transmitted through the light guide means and disposed along the light guide means with a distribution density which varies at a changing rate free from discontinuity so as to adjust the luminance distribution of the light emitted from the light guide means in the forward direction;

said light guide means being in the form of a rectangle, wherein said linear light source and said first reflection means are disposed opposite to each other across one set of parallel sides of the rectangle and a second linear light source and a second first reflecting means are disposed opposite to each other across a second set of parallel sides of the rectangle.

18. An illumination device, comprising:

a linear light source;

a first reflection means disposed opposite to and spaced from the linear light source;

a light guide means disposed between the linear light source and the first reflection means;

a second reflection means disposed behind the light guide means so that light issued from the linear light source is transmitted through the light guide means and reflected by the first and second reflection means to be emitted from the light guide means in a forward direction; and a luminance distribution-adjusting means for reflecting light transmitted through the light guide means and disposed along the light guide means with a distribution density which varies at a changing rate free from discontinuity so as to adjust the luminance distribution of the light emitted from the light guide means in the forward direction;

said light guide means being in the form of a rectangle, wherein said linear light source and said first reflection means are disposed opposite to each other across one set of parallel sides of the rectangle, and other linear light sources are disposed on the other sides of the rectangle.

19. An illumination device, comprising:

a linear light source;

first reflection plate disposed opposite to and spaced from the linear light source;

a light guide member disposed between the linear light source and the first reflection plate;

a second reflection plate disposed behind the light guide member; and a reflection pattern disposed between the light guide member and the second reflection plate comprising a plurality of dots disposed with a varying distribution density such that the distribution density is lower in the vicinity of the linear light source than in the vicinity of the first reflection plate and becomes higher at a position farther from the linear light source and the first reflection plate so as to assume a maximum density which is free from angular deflection, whereby light issued from the linear light source is transmitted through the light guide member and reflected by the first and second reflection plates and the reflection pattern so as to be emitted from the light guide member in a forward direction;

said reflection pattern being disposed between the light guide member and the second reflection plate with varying distribution densities so that the amount of light reflected by the reflection pattern and emitted from the light guide member in a forward direction is larger in a region of a higher distribution density and smaller in a region of a lower distribution density, respectively, of the reflection pattern for an uniform intensity of light incident thereto; and the distribution density of the reflection pattern being increased at corners of the light guide member, whereby the light emitted from the light guide member is made uniform.

20. An illumination device, comprising:

a linear light source;

a first reflection plate disposed opposite to and spaced from the linear light source;

a light guide member disposed between the linear light source and the first reflection plate;

a second reflection plate disposed behind the light guide member; and a reflection pattern disposed on a front side of the light guide member comprising a plurality of dots disposed with a varying distribution density such that the distribution density is higher in the vicinity of the linear light source than in the vicinity of the first reflection plate and becomes lower at a position farther from the linear light source and the first reflection plate so as to assume a minimum density which is free from angular deflection, whereby light issued from the linear light source is transmitted through the light guide member and reflected by the first and second reflection plates and the reflection pattern so as to be emitted from the light guide member in a forward direction;

said reflection pattern being disposed on a front side of the light guide member and opposite the second reflection plate with varying distribution densities so that the amount of light emitted from the light guide member in a forward direction is larger in a region of a higher distribution density and smaller in a region of a lower distribution density, respectively, of the reflection pattern for an uniform intensity of light incident thereto; and the distribution density of the reflection pattern is lowered at corners of the light guide member, whereby the light emitted through the reflection pattern is made uniform.

21. An illumination device, comprising:

a linear light source;

a first reflection plate disposed opposite to and spaced from the linear light source;

a light guide member disposed between the linear light source and the first reflection plate;

a second reflection plate disposed behind the light guide member; and a reflection pattern disposed between the light guide member and the second reflecting plate comprising a plurality of dots disposed with a varying distribution density such that the distribution density is lower in the vicinity of the linear light source than in the vicinity of the first reflection plate and becomes higher at a position farther from the linear light source and the first reflection plate to assume a maximum density which is free from angular deflection, whereby light issued from the linear light source is transmitted through the light guide member and reflected by the first and second reflection plates and the reflection pattern so as to be emitted from the light guide member in a forward direction;

said light guide member being in the form of a rectangle, wherein said linear light source and said first reflection plate are disposed opposite to each other across one set of parallel sides of the rectangle and a second linear light source and a second first reflection plate are disposed opposite to each other across a second set of parallel sides of the rectangle.

22. An illumination device, comprising:

a linear light source;

a first reflection plate disposed opposite to and spaced from the linear light source;

a light guide member disposed between the linear light source and the first reflection plate;

a second reflection plate disposed behind the light guide member; and a reflection pattern disposed between the light guide member and the second reflection plate comprising a plurality of dots disposed with a varying distribution density such that the distribution density is lower in the vicinity of the linear light source than in the vicinity of the first reflection plate and becomes higher at a position farther from the linear light source and the first reflection plate so as to assume a maximum density which is free from angular deflection, whereby light issued from the linear light source is transmitted through the light guide member and reflected by the first and second reflection plates and the reflection pattern so as to be emitted from the light guide member in a forward direction;

said light guide member being in the form of a rectangle, wherein said linear light source and said first reflection plate are disposed opposite to each other across one set of parallel sides of the rectangle, and other linear light sources are disposed on the other sides of the rectangle.

23. An illumination device, comprising:

a linear light source;

a first reflection plate disposed opposite to and spaced from the linear light source;

a light guide member disposed between the linear light source and the first reflection plate;

a second reflection plate disposed behind the light guide member; and a reflection pattern disposed on a front side of the light guide member comprising a plurality of dots disposed with a varying distribution density such that the distribution density is higher in the vicinity of the linear light source than in the vicinity of the first reflection plate and becomes lower at a position farther from the linear light source and the first reflection plate so as to assume a minimum density which is free from angular deflection.

whereby light issued form the linear light source is transmitted through the light guide member and reflected by the first and second reflection plates and the reflection pattern so as to be emitted from the light guide member in a forward direction;

said light guide member being in the form of a rectangle, wherein said linear light source and said first reflection plate are disposed opposite to each other across one set of parallel sides of the rectangle and a second linear light source and a second first reflection plate are disposed opposite to each other across a second set of parallel sides of the rectangle.

24. An illumination device, comprising:

a linear light source;

a first reflection plate disposed opposite to and spaced from the linear light source;

a light guide member disposed between the linear light source and the first reflection plate;

a second reflection plate disposed behind the light guide member; and a reflection pattern disposed on a front side of the light guide member comprising a plurality of dots disposed with a varying distribution density such that the distribution density is higher in the vicinity of the linear light source than in the vicinity of the first reflection plate and becomes lower at a position farther from the linear light source and the first reflection plate so as to assume a minimum density which is free from angular deflection.

whereby light issued from the linear light source is transmitted through the light guide member and reflected by the first and second reflection plates and the reflection pattern so as to be emitted from the light guide member in a forward direction;

said light guide member being in the form of a rectangle, wherein said linear light source and said first reflection plate are disposed opposite to each other across one set of parallel sides of the rectangle, and other linear light sources are further disposed on the other sides of the rectangle.

25. A liquid crystal display apparatus, comprising:

an illumination device according to any one of claims 1–24, and a liquid crystal panel disposed on a front side of the illumination device, which is adapted to be illuminated by the illumination device.

* * * * *

UNITED STATES PATENT AND TRADEMARK OFFICE
CERTIFICATE OF CORRECTION

PATENT NO. : 5,751,386
DATED : May 12, 1998
INVENTOR(S) : TOSHIYUKI KANDA, ET AL.

It is certified that error appears in the above-identified patent and that said Letters Patent is hereby corrected as shown below:

COLUMN 6

Line 22, "may for example" should read
        --may, for example,--.

COLUMN 7

Line 42, "above-embodiments," should read
        --above embodiments,--.

COLUMN 8

Line 6, "p" should be deleted;
    Line 46, "distribution adjusting" should read
        --distribution-adjusting--;
    Line 51, "distribution adjusting" should read
        --distribution-adjusting--;
    Line 56, "further away" should read --further--;
    Line 60, "distribution" should read --distribution- --; and
    Line 67, "distribution adjust-" should read
        --distribution-adjust- --;

UNITED STATES PATENT AND TRADEMARK OFFICE
CERTIFICATE OF CORRECTION

PATENT NO. : 5,751,386

DATED : May 12, 1998

INVENTOR(S) : TOSHIYUKI KANDA, ET AL.

It is certified that error appears in the above-identified patent and that said Letters Patent is hereby corrected as shown below:

COLUMN 9

Line 5, "distribution adjusting" should read
        --distribution-adjusting--;
    Line 8, "distribution adjusting" should read
        --distribution-adjusting--;
    Line 43, "distribution adjusting" should read
        --distribution-adjusting--;
    Line 46, "tion adjusting" should read
        --tion-adjusting--;
    Line 51, "distribution adjusting" should read
        --distribution-adjusting--;
    Line 59, "distribution" should read --distribution- --; and
    Line 66, "distribution adjust-" should read
        --distribution-adjust- --.

COLUMN 10

Line 4, "distribution adjusting" should read
        --distribution-adjusting--; and
    Line 7, "distribution adjusting" should read
        --distribution-adjusting--.

COLUMN 11

Line 3, "first" should read --a first--.

UNITED STATES PATENT AND TRADEMARK OFFICE
CERTIFICATE OF CORRECTION

PATENT NO. : 5,751,386
DATED : May 12, 1998
INVENTOR(S) : TOSHIYUKI KANDA, ET AL.

Page 3 of 3

It is certified that error appears in the above-identified patent and that said Letters Patent is hereby corrected as shown below:

<u>COLUMN 13</u>

Line 12, "form" should read --from--.

Signed and Sealed this

Twenty-second Day of December, 1998

Attest:

BRUCE LEHMAN

Attesting Officer    Commissioner of Patents and Trademarks